United States Patent [19]

Tam et al.

[11] Patent Number: 5,201,063
[45] Date of Patent: Apr. 6, 1993

[54] SETTING OF ELECTRONIC CIRCUITS IN A RADIO TELEPHONE

[75] Inventors: Ambrose W. C. Tam, Taipo; Francis C. N. Lau, Taikoo Shing, both of Hong Kong

[73] Assignee: Astec International Ltd., Hong Kong

[21] Appl. No.: 453,668

[22] Filed: Dec. 20, 1989

[30] Foreign Application Priority Data

Dec. 28, 1988 [GB] United Kingdom ............... 8830282

[51] Int. Cl.$^5$ .................................... H04B 17/00
[52] U.S. Cl. ............................ 455/67.4; 455/115; 455/226.1
[58] Field of Search ............... 455/115, 117, 127, 67, 455/226, 343, 67.1, 67.4, 226.1

[56] References Cited

U.S. PATENT DOCUMENTS

| | | | |
|---|---|---|---|
| 4,417,337 | 11/1983 | Favin et al. ........................... | 371/22 |
| 4,686,466 | 8/1987 | Feuerbaum et al. ............ | 324/158 R |
| 4,868,885 | 9/1989 | Perry ..................................... | 455/226 |
| 4,939,786 | 7/1990 | McCallum et al. ................. | 455/115 |

FOREIGN PATENT DOCUMENTS

| | | |
|---|---|---|
| 84114710.1 | 12/1984 | European Pat. Off. . |
| 87108416.6 | 6/1987 | European Pat. Off. . |
| 0262860 | 4/1988 | European Pat. Off. . |
| 2064248 | 6/1981 | United Kingdom . |

OTHER PUBLICATIONS

B. E. Bachman, "Binary Programmed Power Supply", IBM Technical Disclosure Bulletin, vol. 9, No. 10, pp. 1330–1331, (Mar. 1967).
O. Podzimek, "D/A Converter with V=N—Conversion", Electronic Engineering, vol. 57, No. 697, p. 37 (Jan. 1985).
IBM Corp., "Compensating Non-ideal Voltage Switches in Digital-To-Analog Converters", IBM Technical Disclosure Bulletin, vol. 28, No. 3, pp. 1149, 1451 (Aug. 1985).
W. L. Ross, "Electronically Controlled Resistor Bank", N.T.I.S. Technical Notes, p. 16 (Jan. 1988).

Primary Examiner—Reinhard J. Eisenzopf
Assistant Examiner—Edward Urban
Attorney, Agent, or Firm—Arnold, White & Durkee

[57] ABSTRACT

An electronic device has a circuit whose operation is adjustable by changing a variable component responsive to stored data. The electronic device also has a processor responsive to a stored program for controlling the circuit by receiving new input data and changing the variable component by replacing the stored data with the new input data. Preferably the electronic device has radio frequency circuits for transmitting and receiving a radio frequency signal, and audio frequency circuits for relaying and reproducing an audio signal. For calibration and adjustment during assembly or servicing, the electronic device is connected to automatic testing, checking and adjustment equipment including a computer that provides the input data to change the variable component as required. The calibration or adjustment is made as a series of progressively better approximations to the required valve. By comparing an output signal of the electronic device to a standard signal or predetermined level, the computer decides in which direction to change the stored data to improve the output signal, and makes such an adjustment by transmitting new data to the electronic device. This cycle is repeated until the output signal is within specified limits.

2 Claims, 13 Drawing Sheets

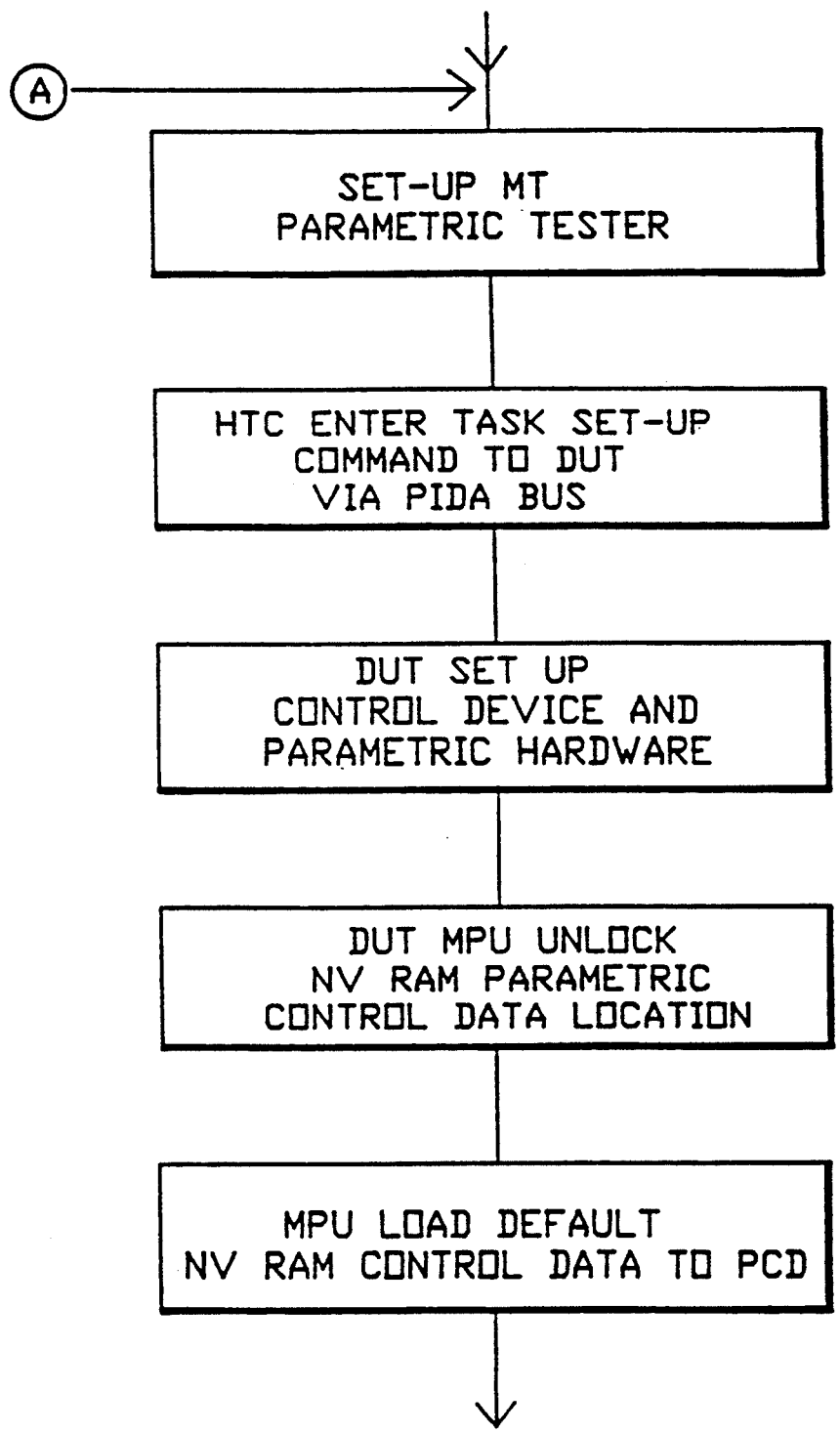

SETTING OF ELECTRONIC CIRCUITS IN A RADIO TELEPHONE

FIELD OF THE INVENTION

This invention relates generally to the setting of circuits in electronic equipment, and in particular to the setting of radio frequency equipment used to transmit and/or receive radio frequency signals.

BACKGROUND OF THE INVENTION

Stringent regulations exist governing the operation of radio telephones, yet they are becoming a widely used consumer product. Accordingly their manufacture and servicing has become highly cost competitive.

In a mobile radio telephone there are many circuits whose resonance frequency, power level and the like have to be within certain critical limits. Thus if one mobile telephone in a cellular mobile telephone system is out of tune, this can interfere with others and its own performance will also suffer. Accordingly once the telephone circuit has been assembled it is then necessary to adjust the circuits using conventional trimming resistors, capacitors and the like. There are a large number of such trimming devices, typically 14 or more in a mobile telephone, and so this involves a great deal of manual input which significantly adds to the cost.

Attempts to reduce this manual trimming have involved the selection of high quality components for the circuits. However this involves more expensive components and is not a solution to maintaining the long term compliance of the mobile telephone with the regulations. Electronic components age with use and their properties change. It is therefore necessary for the mobile telephone to be serviced about once a year to ensure it still meets the regulations. Because mobile telephones are widely used consumer items, however, inexpensive servicing costs and speed of servicing are important objectives. But the large number of manually required adjustments with conventional mobile telephones has prevented the achievement of these desirable objectives and has discouraged owners from undertaking regular servicing.

SUMMARY OF THE INVENTION

The primary object of the invention is to provide a quicker and less expensive way of adjusting mobile telephones and electronic equipment generally, both during initial manufacture and its servicing.

Briefly, in accordance with a primary aspect of the invention, there is provided a method of setting an electronic circuit within an electronic device which has a radio frequency output/input, and an audio frequency input/output, in which one or more parameters of the circuit are checked and if necessary altered to suit preset requirements by application of a standard signal to the circuit to cause the circuit to provide an output corresponding to a parameter to be checked and the resulting output is determined against a desired standard, an adjusting data signal designed to alter the output towards the desired standard is supplied to the circuit if the resulting output differs from the desired standard, means are provided within the device to receive the adjusting data signal to adjust the one or more parameters of the circuit accordingly and to store the adjusting data signal for future control of the circuit according to the data of that signal, the standard signal is again applied and the resulting output determined, and the cycle is continued if necessary until the resulting output matches the desired standard. The method can be applied in succession to check a number of parameters within an electronic device.

The invention also extends to the electronic devices themselves. According to this aspect of the invention, there is provided an electronic device comprising electronic circuitry having one or more circuits whose operation is adjustable by changing a variable component within those circuits, means for operating those circuits according to stored data, and program means within the circuitry for controlling the operation of those circuits, the program means being capable of receiving an input data signal for modifying that control by changing a variable component in a circuit, and storing that new input data to ensure future control of the circuitry according to that new data, the circuitry preferably comprising one or more radio frequency circuits for transmitting and/or receiving a radio signal, and one or more audio frequency circuits for relaying or reproducing an audio signal.

By following the invention it is possible for the electronic device to be set by calibration, tuning or adjustment in a quick and largely automatic manner with the minimum of manual involvement. Thus either after assembly or for later servicing, it is only necessary to connect the electronic device to automatic testing, checking and adjusting equipment and thereafter this equipment will set or reset the various circuits as required. This equipment will, for example, comprise a signal generator, a modulation analyzer and audio analyzer connected to the radio frequency input/output, and a computer programmed to control the signal generator and analyzers in response to the signal received from the device under test, the program monitoring the output in response to the input and, if necessary because the output signal is not within predetermined and required levels, sending the adjusting signal before again monitoring the output. In general terms for each particular parameter under test, the calibration, tuning or adjustment is made as a series of progressively better approximations to the required values; thus the results of a first test are evaluated by the computer, this then decides in which direction an adjustment should be made to improve the output, makes the adjustment in the device under test, makes a second test, evaluates this and if necessary makes a further refining test and so on until the result is within the limits set.

The invention therefore greatly simplifies the manual input to set up the circuitry after assembly and provides a quick and relatively inexpensive way for the device to be serviced from time to time to ensure it meets the required specifications and regulations governing its use.

If the telephone has a data input/output line, e.g. as part of a normal connection to a handset, the adjusting data can be supplied through that line. Alternatively if the telephone has integral ear and mouthpieces, the data could be encoded and input as an audio signal through the microphone or as a radio frequency signal supplied to the radio frequency input.

The operations of the electronic device during its normal operation and the setting of the circuits according to the invention are controlled according to a program held in the memory of a programmable memory forming part of the device. This programmable memory could, for example, be an SRAM provided with a suitable back up battery to ensure that memory is not lost when the electronic device is not operating or an EEPROM which can be electrically erasable and programmable but will keep its program when the power is off. After calibration or adjustment, the memory is arranged to retain the values of the levels found to be correct and operates the device at these levels when the electronic device is operated until the memory is again changed the next time the device is tested.

Referring to the specific example of a mobile radio telephone, there are a number of parameters which need adjustment after assembly and from time to time to ensure that the telephone conforms to the standards and regulations. For the United States, for example, which is the largest market for such items, FCC regulations require, inter alia, the following:

On the transmitting side:
1. The transmission frequency must remain within 2.5 parts per million over a range of temperatures of $-30°$ to $+60°$ C. and a range of supply voltages of 10.8 to 15.6 V.
2. Each transmitting power level must be accurate to within $+2$ dB and $-4$ dB.
3. The transmission modulation, either phase or frequency modulation, has to be within $\pm 10\%$. To achieve this the following circuits need to be capable of adjustment:
   a) signalling tone;
   b) wideband data circuit;
   c) the supervisory audio tone;
   d) the dual tone multiple frequency; and
   e) audio signal modulation limit.

On the receiving side, the following need to be capable of adjustment:
1. The Receive performance, which means the frequency to which the receiver is set;
2. The Receive audio level;
3. The Receive data level; and
4. The Receive signal strength indication level.

All of these will usually need adjustment with time with the possible exception of the receive performance. The latter may be a high quality frequency synthesizer circuit whose consistency with time will not change sufficiently to require adjustment or more preferably a single frequency generator may be provided both for the transmission and the receiving signal, a constant difference being provided between the transmission frequency and the receive frequency. In this way once the transmission frequency has been set by adjusting the single frequency generator, the receive frequency will automatically become set to the correct difference from the transmission frequency.

BRIEF DESCRIPTION OF THE DRAWINGS

Other objects and advantages of the invention will become apparent upon reading the following detailed description and upon reference to the drawings, in which.

Figure 1:
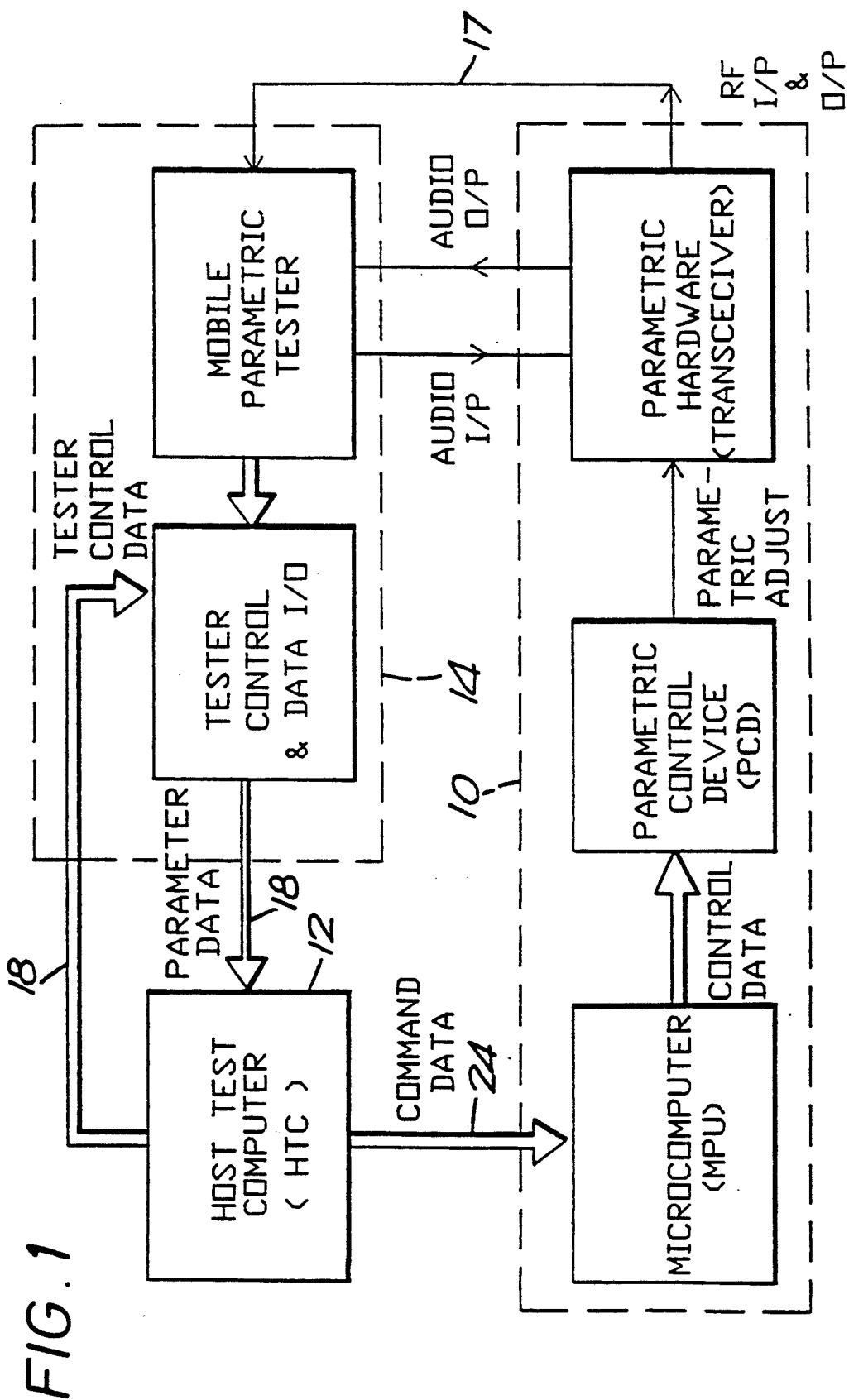
FIG. 1 is a block diagram showing the major components of a mobile telephone and its connections to apparatus to check its performance and adjust it.
Figure 2A:
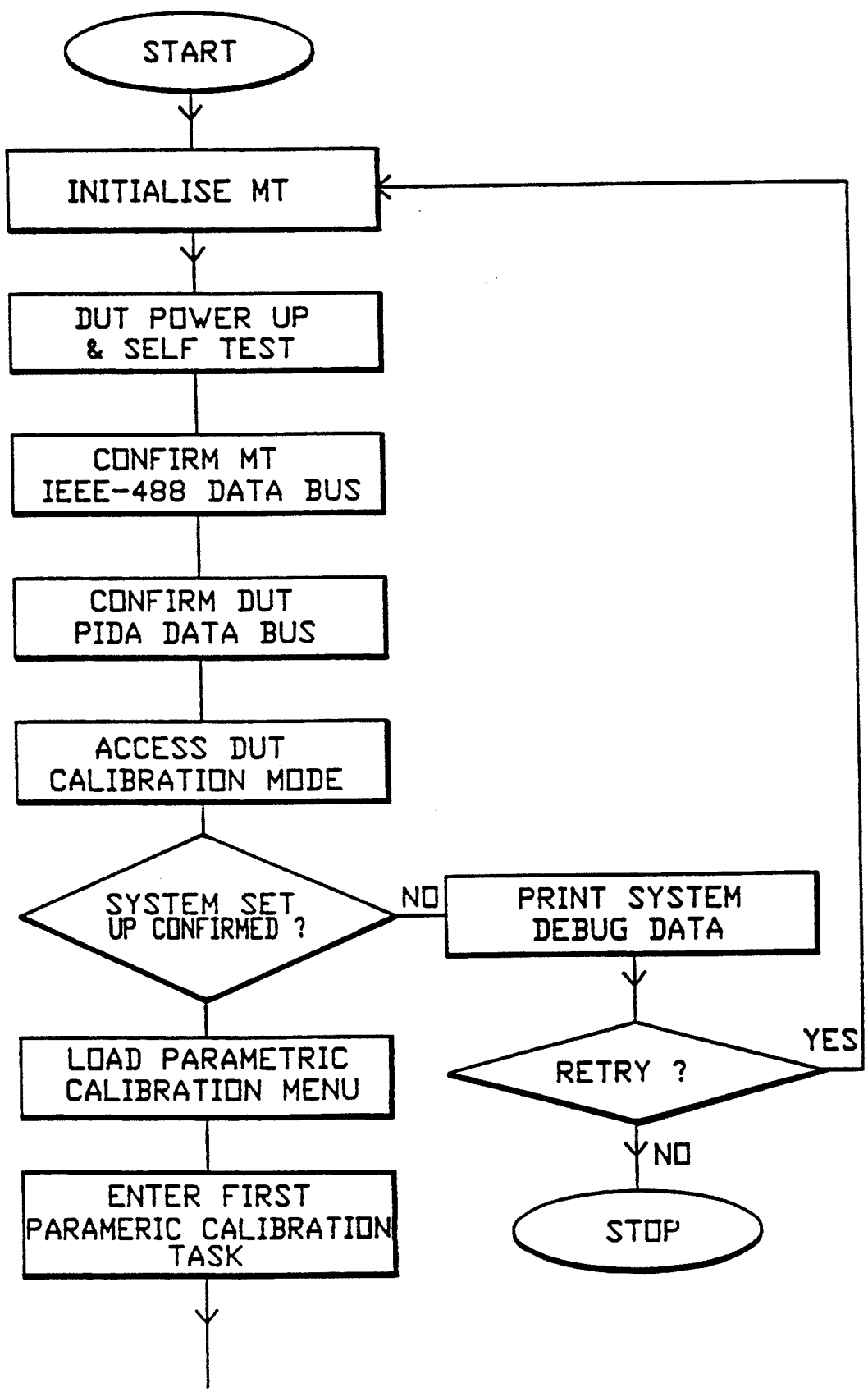
FIG. 2 is a flow diagram showing the checking and calibration of the mobile telephone, FIG. 2 being split into parts 2A to 2D.
Figure 2C:
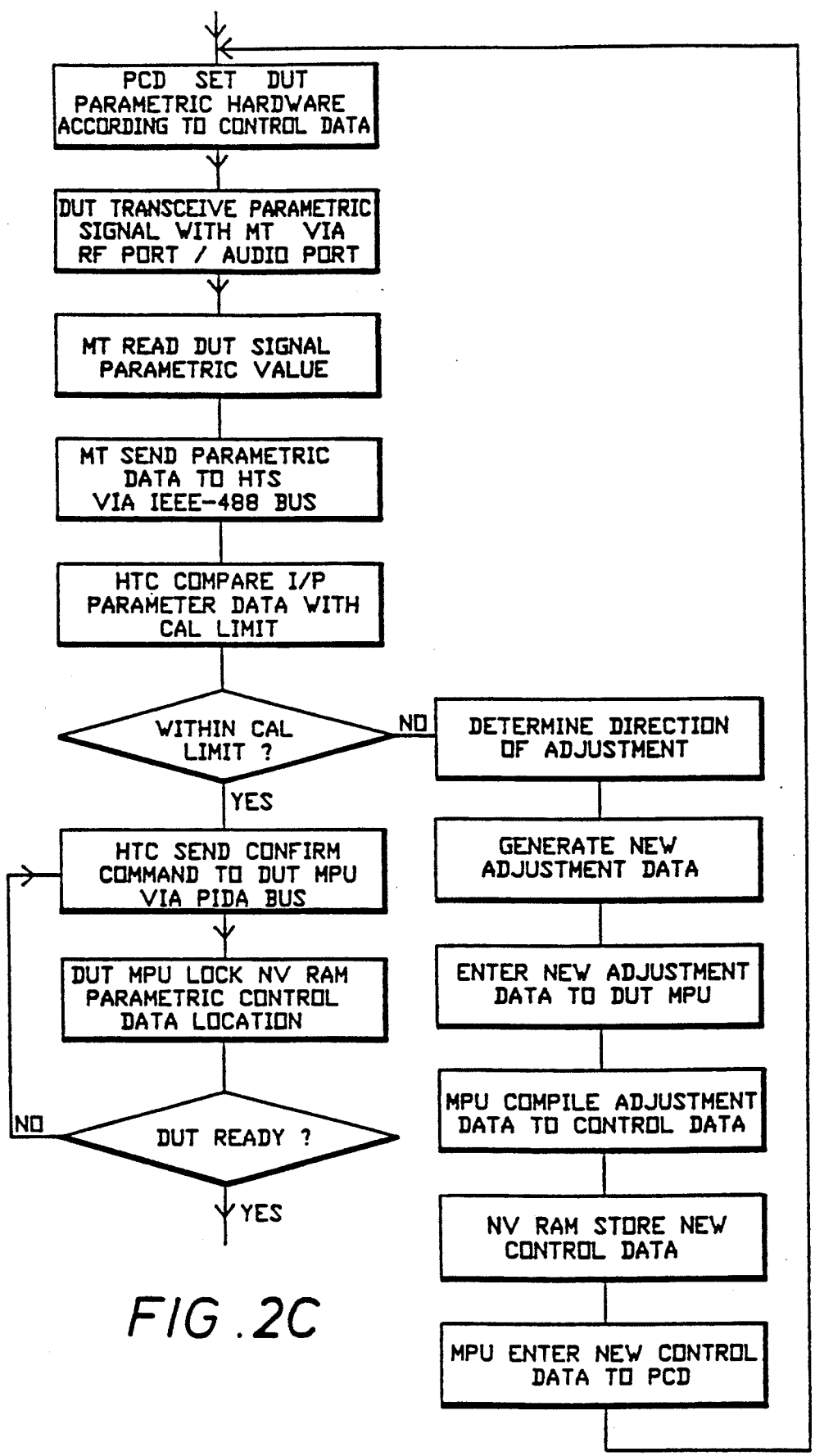
Figure 2D:
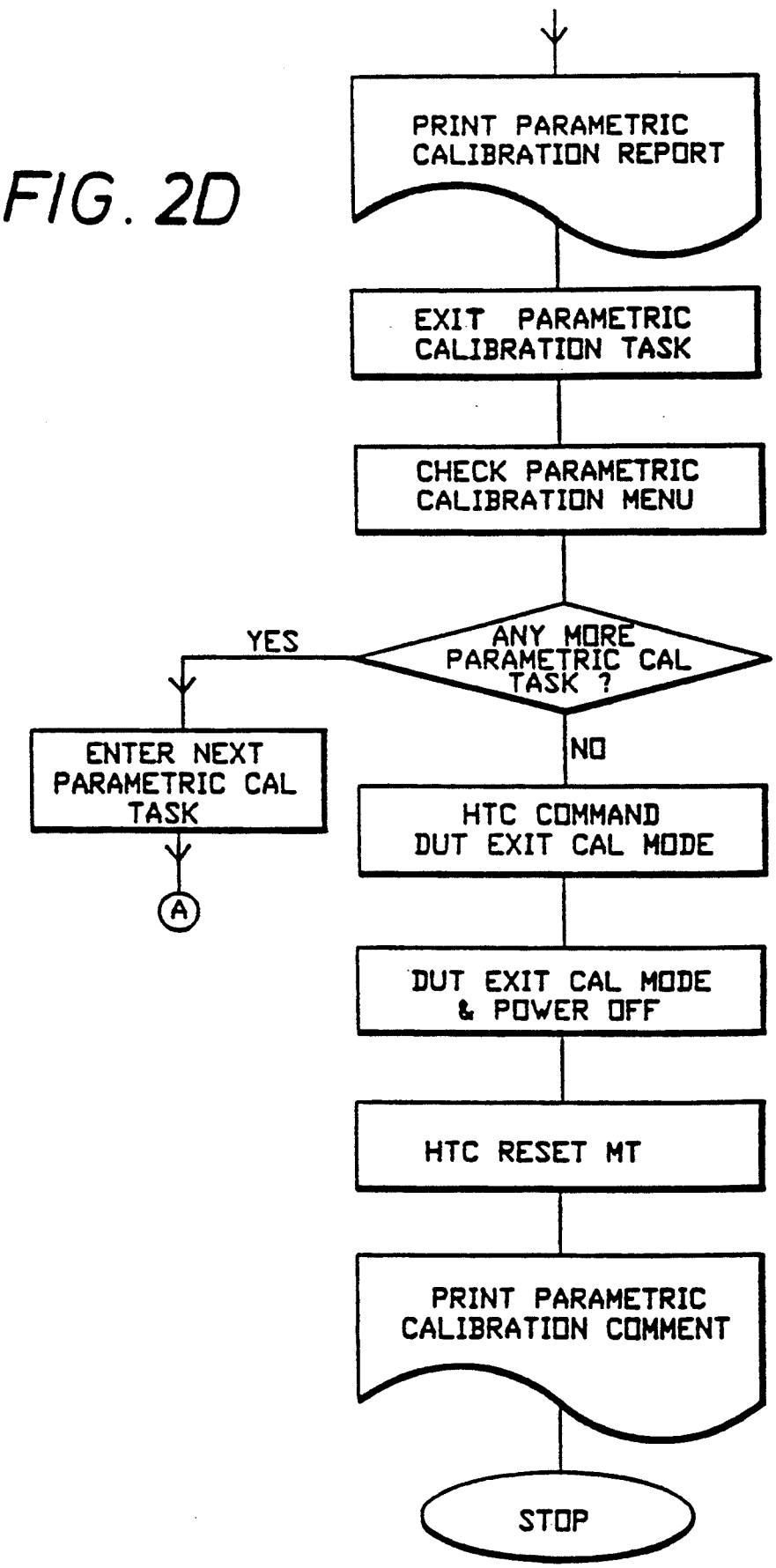

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to FIG. 1 of the drawings, there is shown a mobile radio telephone 10 connected to a computer 12 and a mobile tester 14 for adjusting the mobile telephone in accordance with the method of the present invention.

The telephone 10 has a radio frequency antenna connection (16 in FIG. 3) which normally carries the receive and transmit signal from and to an antenna (not shown). Instead, during testing, the antenna connection is connected to the mobile tester 14 via a coaxial cable 17. The mobile tester is in turn controlled by the output from the computer 12 via an IEEE 488 Bus 18 from an IEEE 488 interface card in the computer.

The telephone 10 also has a peripheral terminal (20 in FIG. 3). This would normally be connected to a telephone handset (22 in FIG. 3) but, during the testing, the handset 22 is removed and the terminal 20 is connected to the computer 12 via a Peripheral Interface for Data and Audio (PIDA) Bus 24 from mobile phone test interface card (26 in FIG. 7) in the computer 12. The PIDA Bus is a known serial communication system which provides open-ended interconnection for multiple peripherals to be linked to a single transceiver.

The mobile tester (MT) 14 is a well-known piece of equipment. For example it can be the equipment sold by Marconi under the reference No. 2955 or that sold by Hewlett Packard under the reference No. HP8957S. By way of example, the later will comprise an HP8901B Modulation Analyzer, and HP8656B Synthesized Signal Generator and HP8903B Audio Analyzer and HP8958A Cellular Radio Interface. Such testers are well known and operate in an automatic fashion in checking a mobile telephone. In a conventional mode of operation, a mobile tester first checks the transmission frequency against the standard required, the user then manually trims the frequency in the telephone unit according to the directions given by the tester, and the tester then automatically rechecks the transmission frequency and if necessary indicates a further trim change to be made. According to the invention, however, the mobile tester 14 is controlled by a program in the computer 12 and in addition the computer supplies to the telephone data signals to make automatic adjustments in the telephone to effect whatever trimming is required.

The computer 12 itself can conveniently be one of the readily available personal computers on the market such as the IBM PC.

The computer 12 operates under the control of a program to feed an input into the telephone 10 and check the resulting output from the mobile tester 14. The computer 12 then signals an adjustment to one or more circuits of the telephone in turn and checks the change in the resulting output. If the output is not within the required limits, the computer continues making adjustments until the output is satisfactory.

A flow chart of a representative portion of the program for the computer 12 is shown in FIGS. 2A, 2B, 2C and 2D. The flow chart is believed to be largely self-explanatory and shows the steps in testing one of the parameters of the mobile telephone. Similar program steps are followed for different parameters. The term DUT is used in FIG. 2 to refer to the device under test, i.e. the mobile telephone 10. The major steps of the program include:
a) initialize the system;
b) set up the mobil tester 14;
c) initiate the check of a particular parameter;
d) determine the result and decide if an adjustment is required and if so what (if no adjustment is required, go to the next step g);
g) provide the option of returning to step c to check another parameter;
h) exit the system.

Certain mobile radio telephones are portable and have no separate handset. It is however conventional for them to have a peripheral connector giving the audio output signal and so that connector can be used when the telephone is under test.

Figure 3A:
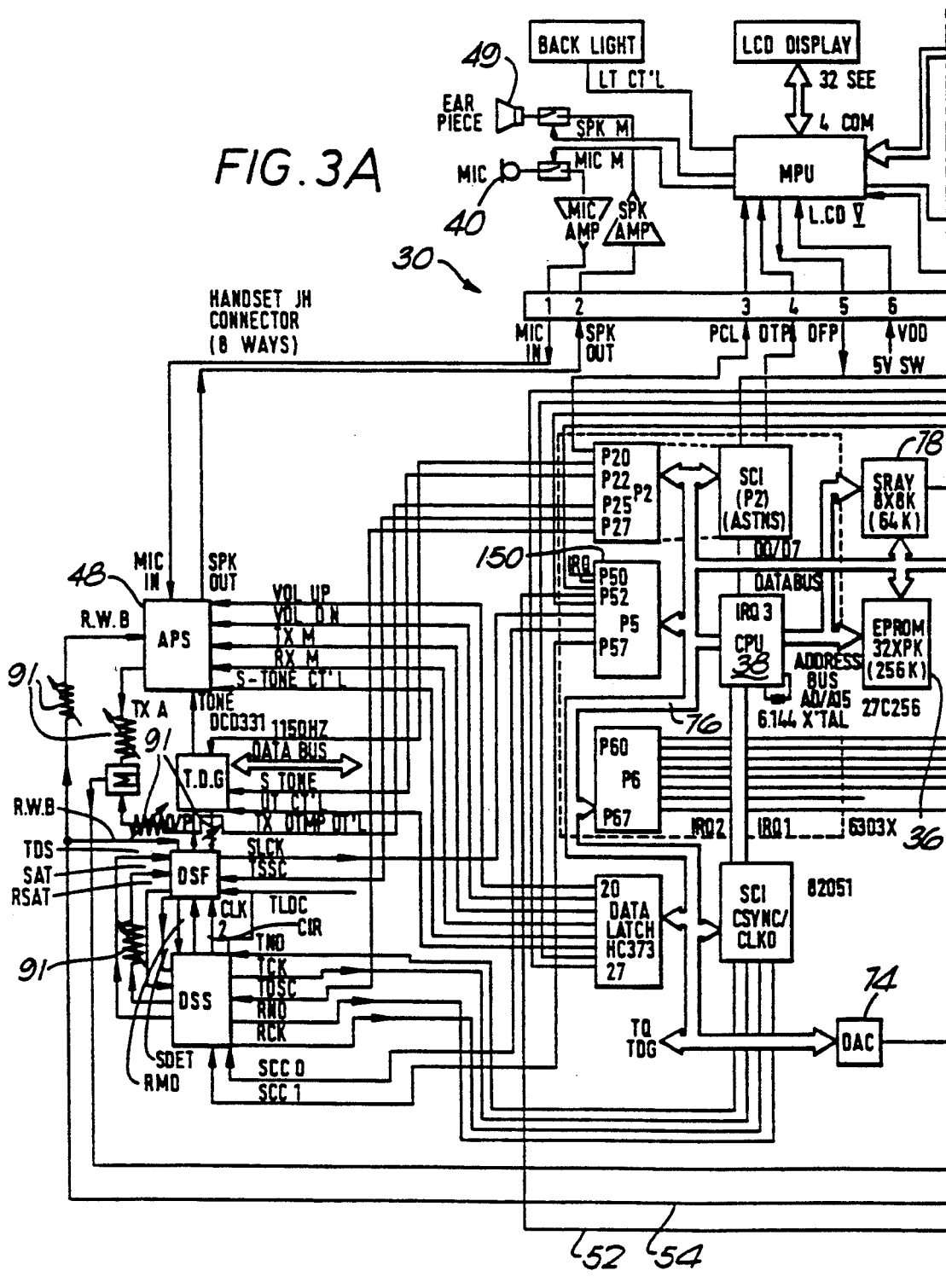
FIGS. 3A and 3B are a block diagram of a mobile telephone according to the invention.
Figure 3B:
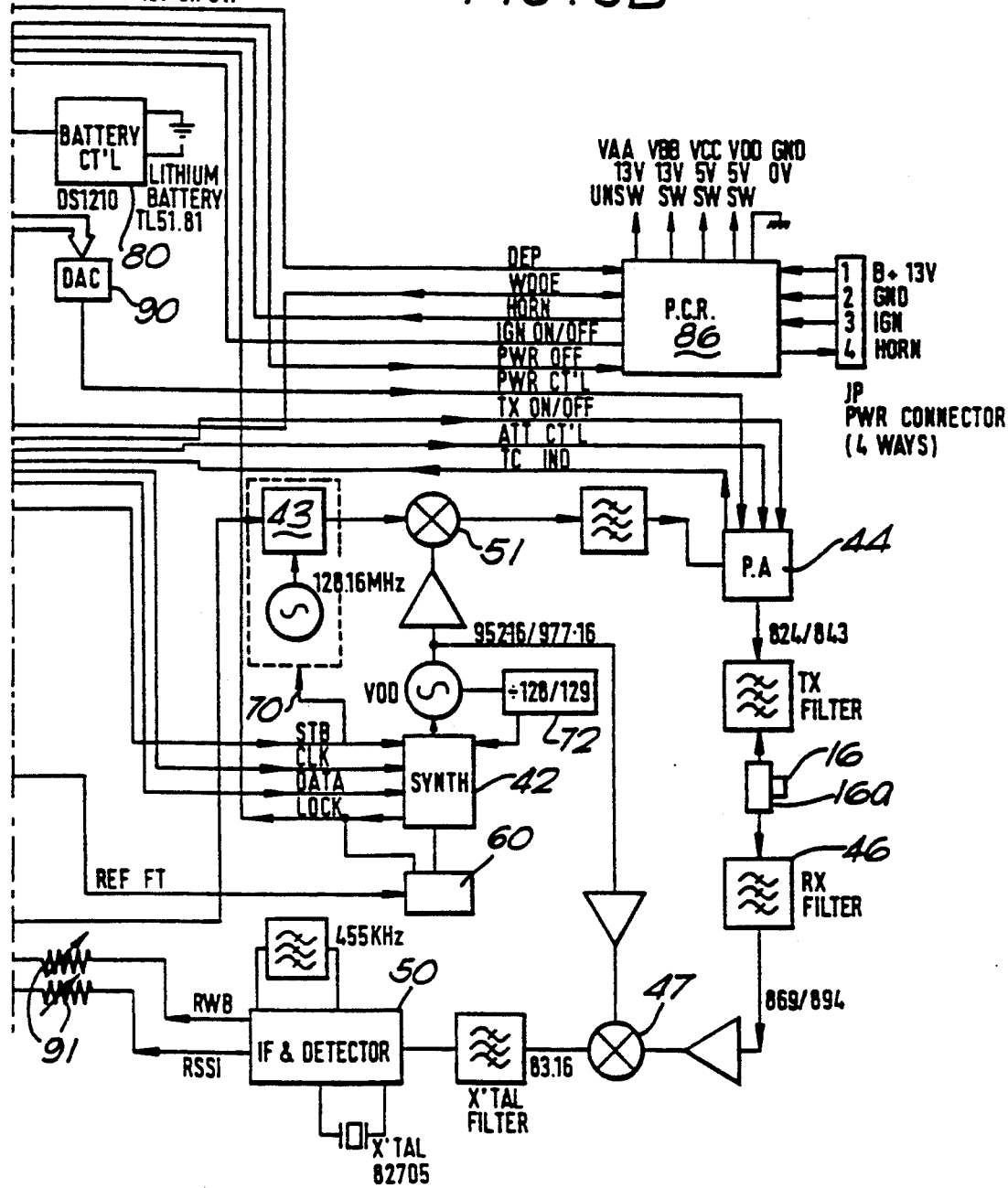

The following is a legend of abbreviations used in FIGS. 3A and 3B:
APS—AUDIO PROCESSING SUB-SYSTEM
TDG—TONE & DTMF GENERATOR
DSF—DATA & SAT FILTER
DSS—DATA & SAT SUB-SYSTEM
PCR—POWER CONTROL & REGULATOR
PA—POWER AMPLIFIER
TFS—TX FREQ SYTHESIER
RFS—RX FREQ SYTHESIER
RID—RF, IF & DETECTOR
PMP—PERIPHERAL MICRO PROCESSOR
HPC—HANDSET POWER CONTROL FIG. 3 shows an example of the circuitry 30 of a mobile radio telephone 10 according to the invention. This is a block diagram showing the major component systems and their inter-relationship. It shows the telephone in a form which has the separate handset 22 connected to the remainder of the circuitry via an 8-way peripheral connector 20.

Additionally the telephone 10 has the antenna connection 16 for transmitting and receiving the radio frequency signals to and from an antenna (not shown).

The normal operation of the radio telephone 30 is conventional and forms no part of the present invention. Therefore its normal operation as a radio telephone will not be described in detail.

The telephone circuitry 30 operates under the control of a program stored in an EPROM 36 which in turn controls a central processor 38. The central processor performs normal radio telephone control operations in the conventional fashion. The central processor also controls the setting of the telephone circuitry 30 in accordance with the present invention, as further descried below.

Sound input from the user is received by a microphone 40 and handled by an audio processing sub-system 48. This signal is frequency modulated in a modulator 43 onto a high frequency signal derived from a crystal oscillator 60 and mixed in a mixer 51 with a radio frequency signal derived from a frequency synthesizer 42. The signal from the mixer 51 is then sent through a power amplifier 44 and duplexer 16a to an antenna (not shown) connected to the antenna connector 16.

Signals received by the antenna (not shown) pass to the connector 16, and the duplexer 16a directs them to a wide band radio frequency filter 46 to select the receive frequency. The received signals are demodulated by mixing with a receive-frequency local oscillator signal from the frequency synthesizer 42 in a mixer 47 to generate an IF frequency signal which passes through an IF detector 50. The IF detector provides a receive signal strength indicating signal along a line 52 and a wide band audio signal along line 54. The audio signal passes to the audio processor sub-system 48 and then to an ear piece 49 in the hand set 22.

When the circuitry 30 in the telephone is to be tested, it is connected as described above with respect to FIG. 1 and tested as further described with respect to FIGS. 2A-2D. The adjustment of particular portions of the circuit are made in various manners as will now be described.

Figure 4:
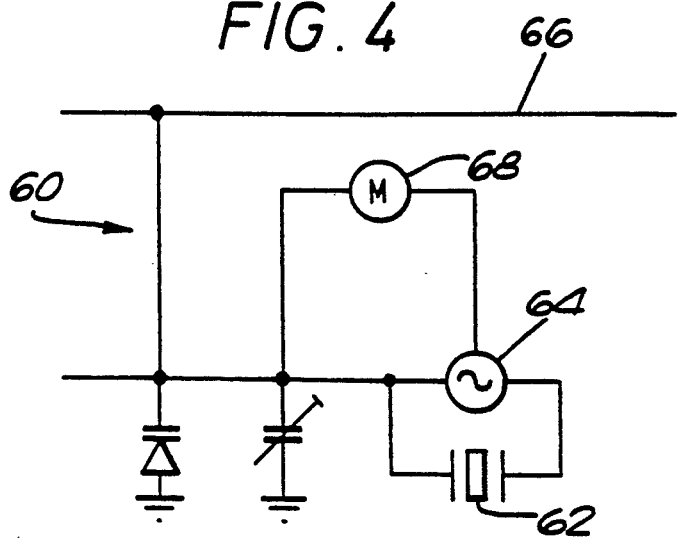
FIG. 4 is a detail circuit diagram of the crystal oscillator in the telephone.

FIG. 4 shows a detail of the crystal oscillator circuit 60 which provides the reference frequency for the frequency synthesizer 42 for providing transmit and receive frequencies. The crystal oscillator comprises a crystal 62 linked to an oscillating circuit 64. The precise frequency of the crystal oscillator is adjusted by a DC control voltage on a line 66 from a DC source (74 in FIG. 3), and a temperature sensor 68 is provided to maintain frequency stability during temperature changes. Such a crystal oscillator circuit 60 is a conventional voltage-controlled TCXO circuit and is a well known component. For example it could be a component sold under the item No. VC-TCXO-43C by Kinseki Limited which can, by choice of suitable external components, be set to a standard frequency in the range of 13 to 18 MHz, e.g. a frequency of say 15.35 MHz, and its frequency deviation from that set figure can be varied over a range of 20 ppm, i.e. ±10 ppm, as the voltage supply varies over the range of 0.5 to 4.5 V. Usually an adjustment of 3 to 10 ppm in this frequency will be found to be sufficient to make any transmission frequency correction required.

Referring back to FIG. 3, the output from the oscillator circuit 60 passes to the frequency synthesizer 42 and also via a line 70 to the modulator 43. The synthesizer 42 is controlled by data from the EPROM which sets the synthesizer to the assigned transmit frequency channel. The resulting output is stabilized by a divider circuit 72 to provide the required frequency channel, a particular channel being set by the divide rates of the circuit 72. The output of the synthesizer 42 is an IF frequency which passes to the mixer 51 to provide the transmit frequency and also passes to the mixer 47 on the receive side to provide the receive-frequency local oscillator signal. Thus it is only necessary to adjust the frequency of the oscillator 60 so that the transmit frequency is correctly set and the receive frequency will accordingly become set as well since the receive frequency will then automatically be the transmit frequency plus 45 MHz which the IF detector 50 will receive.

The control voltage applied to the oscillator circuit 60 is derived from a digital to analogue convertor (DAC) 74. The DAC in turn is supplied with data from a DATA bus 76. The data controls the control voltage from the DAC 74. For normal operation the DAC 74 is supplied with previously assigned and preset data from a Static RAM 78. The RAM 78 contains data corresponding to the previously set values and operates under the control of the EPROM 36. The RAM 78 has a battery backup 80 to ensure that data is not lost when the telephone is not operating.

Figure 5:
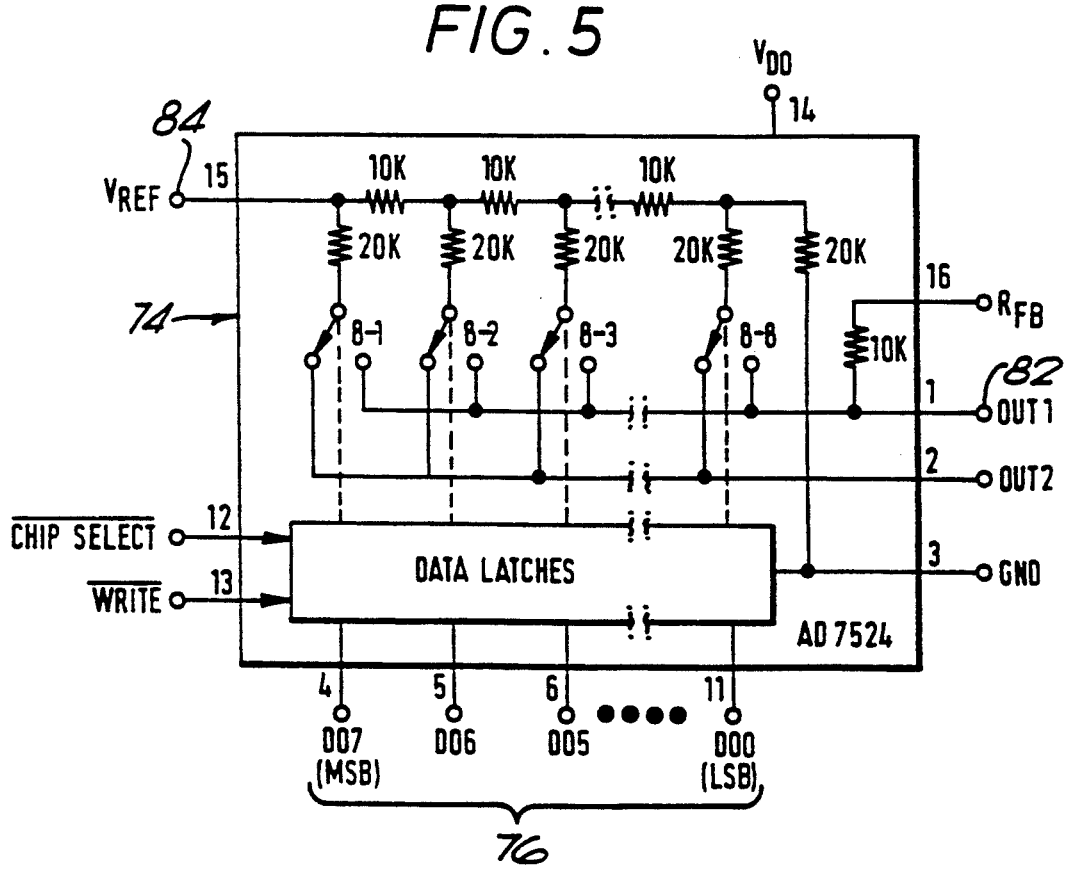
FIG. 5 is a diagram of a DAC device used as one component in the adjustment of certain of the parameters of the telephone.

The DAC 74 is a well known and available component and can, for example, be that obtainable from Analogue Devices under the number AD7524. FIG. 5 shows a diagram of such a component. Basically the DAC will, under the control of DATA it receives from the Bus 76, switch the various resistors shown to provide an adjustable voltage output on pin 82 to supply the circuit 60 from the constant input voltage supplied on pin 84 from a power supply 86 for the telephone.

Figure 6:
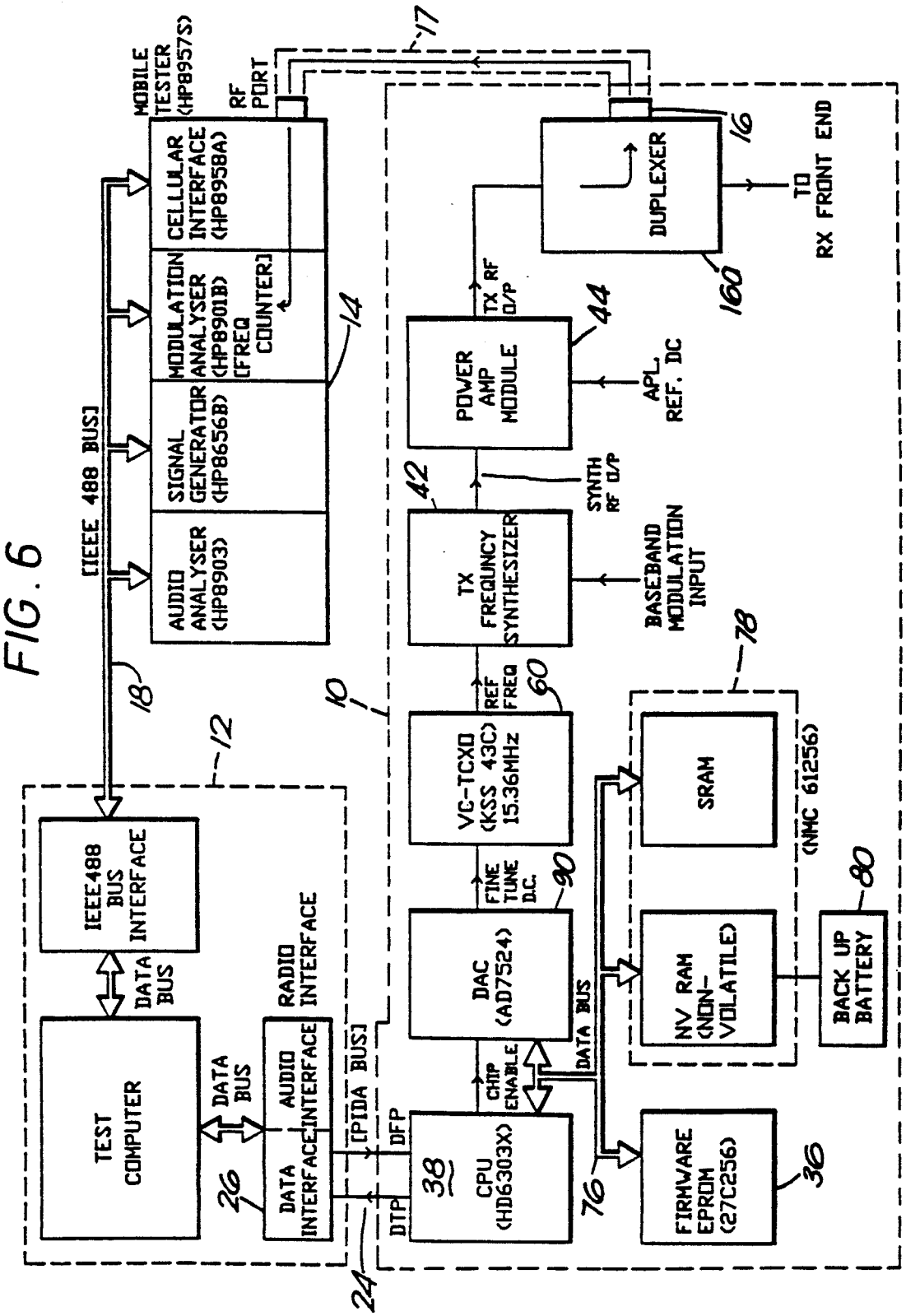
FIG. 6 is a more detailed diagram based on FIG. 1 but showing only those parts which are active during the adjustment of the frequency of the telephone.

Turning now to FIG. 6, there is shown a more detailed diagram of the test configuration of FIG. 1. FIG. 6, however, specifically shows the connections and parts which are active when the transmission frequency of the telephone is to be tested and if necessary adjusted either after manufacture or during servicing.

The computer 12 initiates the telephone into transmission via the PIDA bus 24 which is connected to the telephone's peripheral connector (20 in FIG. 3). The computer 12 also sets the mobile tester 14 so that its modulation analyzer will be able to check the frequency of the signal transmitted from the telephone's antenna connector 16. The resulting transmission frequency is checked by the mobile tester 14 and the results passed to the computer 12. If the latter decides that an adjustment to the frequency of the telephone's crystal oscillator circuit 60 is required, new data is supplied over the PIDA bus 24 through the data peripheral (DFP) line No. 5 to the peripheral connector (20 in FIG. 3). This data is received by the CPU 38 and passes to the data bus 76. There it adjusts both the Static RAM 78 by inserting a new value for the control of the DAC 74 and also resets the DAC with the new data to give a new control voltage output to the crystal oscillator circuit 60.

The computer 12 then again initiates the telephone into transmission and repeats these operations following the flow chart of FIGS. 2A-2D until the transmission frequency, and accordingly the receive frequency, is within the pre-assigned limits. It is necessary to adjust these frequencies first of all since all of the other parameters to be checked depend upon the frequencies of transmission and reception being correctly adjusted.

Figure 7:
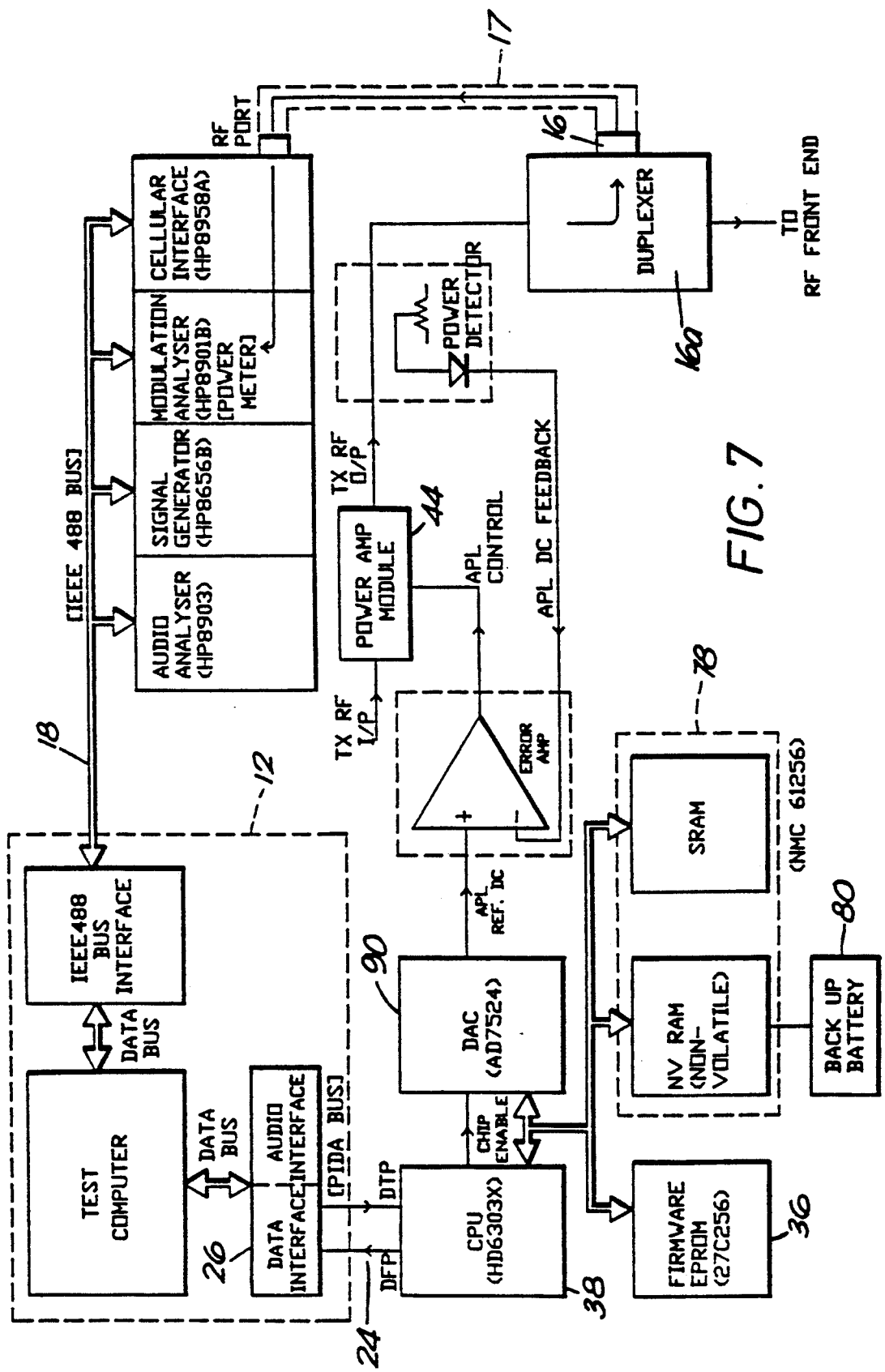
FIG. 7 is a diagram similar to FIG. 6 but showing the parts which are active during the adjustment of the transmit power levels.

The next step is the adjustment of the transmit power levels. The pertinent telephone circuits 60 are shown in FIG. 7. The computer 12 has now set-up the modulation analyzer power meter in the mobile tester to check on the transmission power output from the telephone. The power levels are determined by the power amplifier 44. This is an amplifier whose gain is directly proportional to its supply voltage. The telephone 10 is designed so that the amplifier 44 operates at one of 8 power levels, and accordingly one of 8 supply voltage levels, so that the power outputs at the 8 levels are as follows:

| Power Level | Nominal Output (dBw) |
| --- | --- |
| 0 | 6 |
| 1 | 2 |
| 2 | −2 |
| 3 | −6 |
| 4 | −10 |
| 5 | −14 |
| 6 | −18 |
| 7 | −22 |

The nominal value for power level 0 is 4.0 W (i.e. +6 dBW).

The voltage supply to the amplifier 44 is controlled by a DAC 90. The DAC 90 is similar in construction and operation to the DAC (74 in FIG. 3) controlling the crystal oscillator circuit (60 in FIG. 3).

During the normal operation of the telephone 10, the DAC 90 will receive data stored in the Static RAM 78 to provide a particular voltage output for a particular power level, the level being chosen from moment to moment by the conventional portion of the program in the EPROM 36. However, when the telephone is under test, each power level, starting from 0 through to 7, is checked and reset if necessary, by changing the value stored in the Static RAM 78 for that power level in an exactly analogous manner to the adjustment of the frequency of the circuit 60. In the particular example shown, the data bus carries an 8 bit byte and so 256 voltage levels from the highest to lowest are possible, and each of the 8 power levels can therefore have 32 steps of adjustment which is found to be adequate for any necessary adjustment.

The DAC's 60 and 90 include variable resistors which are capable of taking a DC signal, i.e. a voltage level. They would not however pass an AC audio signal. Accordingly, a different form of variable resistor is required for the adjustment of audio and variable signals for the other required adjustments. One form of suitable variable resistor is a digitally controlled potentiometer, such as that sold under the name E$^2$POT by Xicor Corporation.

Figure 8:
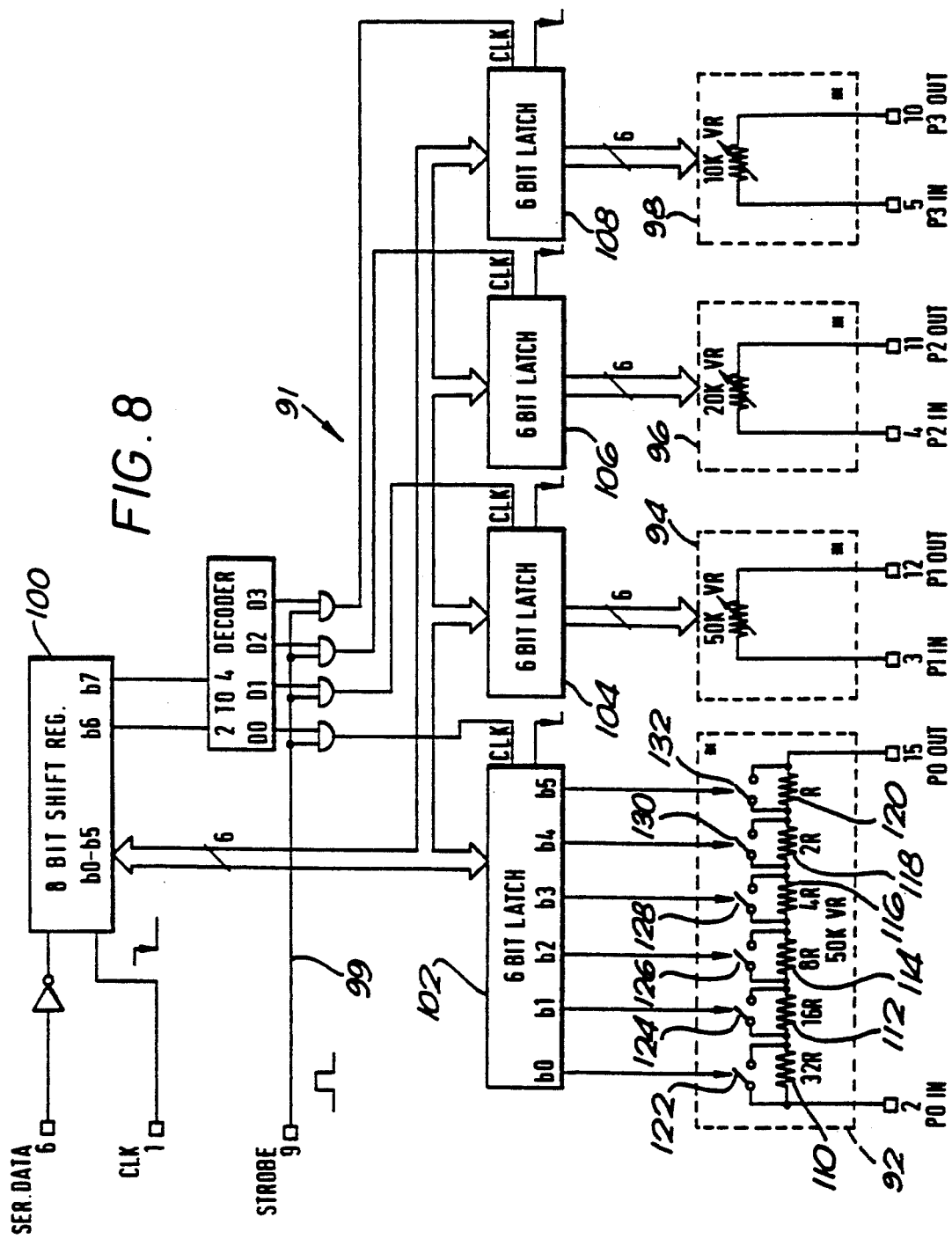
FIG. 8 is a functional block diagram of a variable resistor bank used as one component in the adjustment of certain parameters of the telephone.

It is preferred, however, to use a variable resistor bank 91 as shown in FIG. 8, the values of resistance for each resistor being variable according to the value of a 6-bit byte of information. These variable resistors can then be used as trimming resistors in the adjustment of the transmission modulation deviations, signalling tone, wideband data circuit, supervisory audio tone, dual tone multiplier frequency, audio signal frequency limit, receive audio, receive data and receive signal strength indication level as will be described below.

Referring to FIG. 8, there are four variable resistors, 92 to 98. When one of these is to be varied, the appropriate serial signal is sent via the PIDA bus (24 in FIG. 7) and the EPROM program will arrange to provide an appropriate strobe signal at line 99, the data also updating and being stored in the Static RAM 78. The data is supplied along the bus 76 to a shift register 100 and then shifted through the register 100 to one of four 6-bit latches 102 to 108 each associated with a respective resistor 92 to 98. The data is received in the latches upon receipt of a strobe signal applied along line 99.

Each variable resistor is basically the same and so only the resistor 92 will be described in detail. It is composed of six resistances 110 to 120 wired in series and across each resistance 110 to 120 is a respective electronic analogue switch 122 to 132. The values of each resistance are in the progression $2^0$, $2^1$, $2^2$ etc., so that their absolute values are R, 2R, 4R etc. In this way by appropriate opening and closing of switches 122 to 132, the variable resistor can have a value which varies step-wise from 0 to 63R.

For each variable resistor 92 to 98 the absolute value of R can be different and is chosen according to the circuit which it is to control. For example the resistors 92 and 94 are shown in FIG. 5 as having absolute values of a maximum of 50K, resistor 96 has a maximum value of 20K, and resistor 98 a maximum value of 10K.

The data held in the latches 102 to 108 controls the opening and closing of the switches 122 to 132. For example, it could be that if the data were 000000 then all switches would be closed so giving a value of 0R. If the data were 000001 then the switch 132 associated with the resistance 102 would be opened giving a value of 1R. If the data were 001010 then the switches 126 and 130 associated with the resistances 114 and 118 would be opened giving a value of 10R, and so on.

Figure 9:
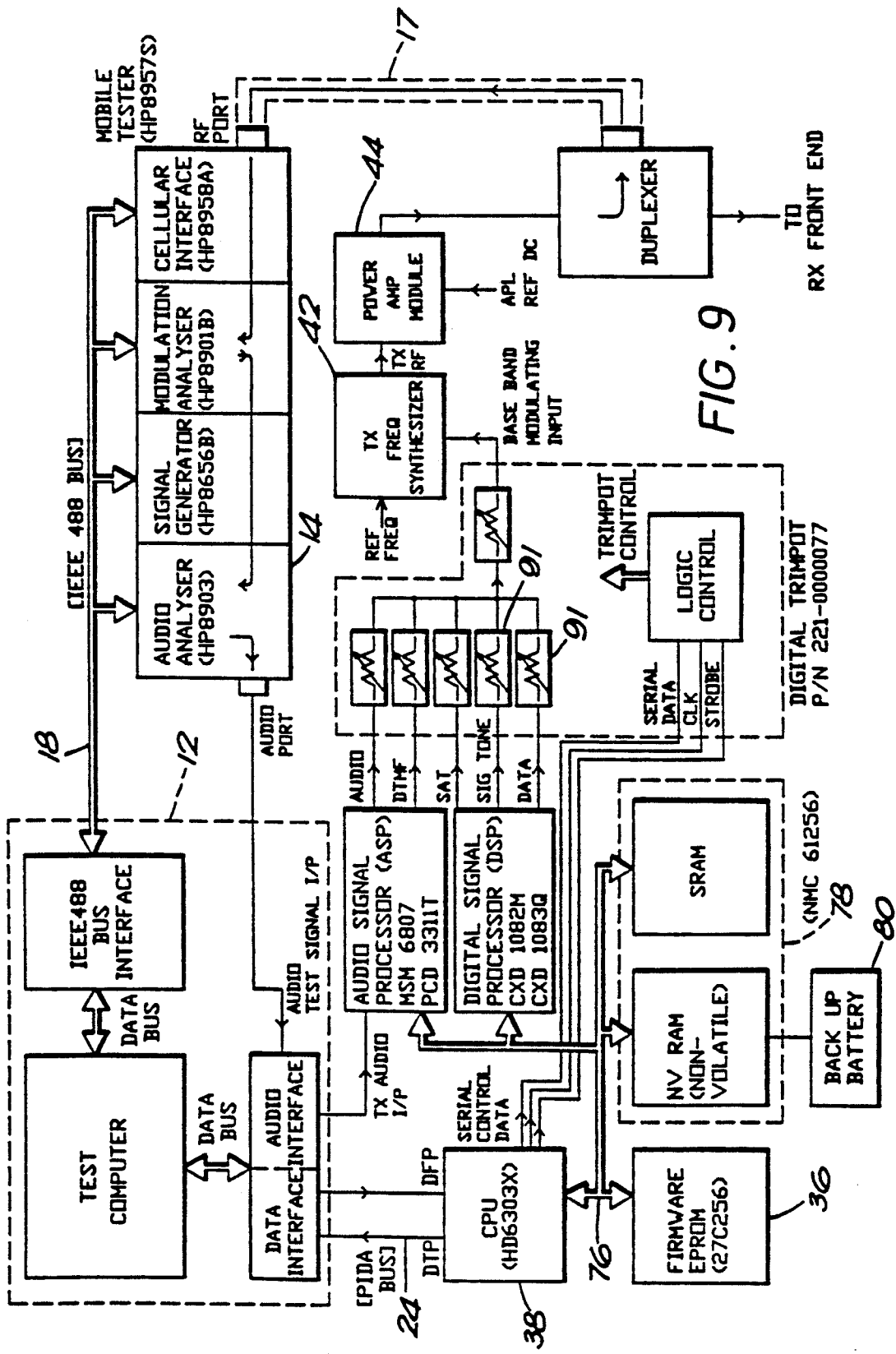
FIGS. 9 and 10 are diagrams similar to FIG. 6 but showing those parts which are active during the adjustment respectively of various transmit and receive parameters.
Figure 10:
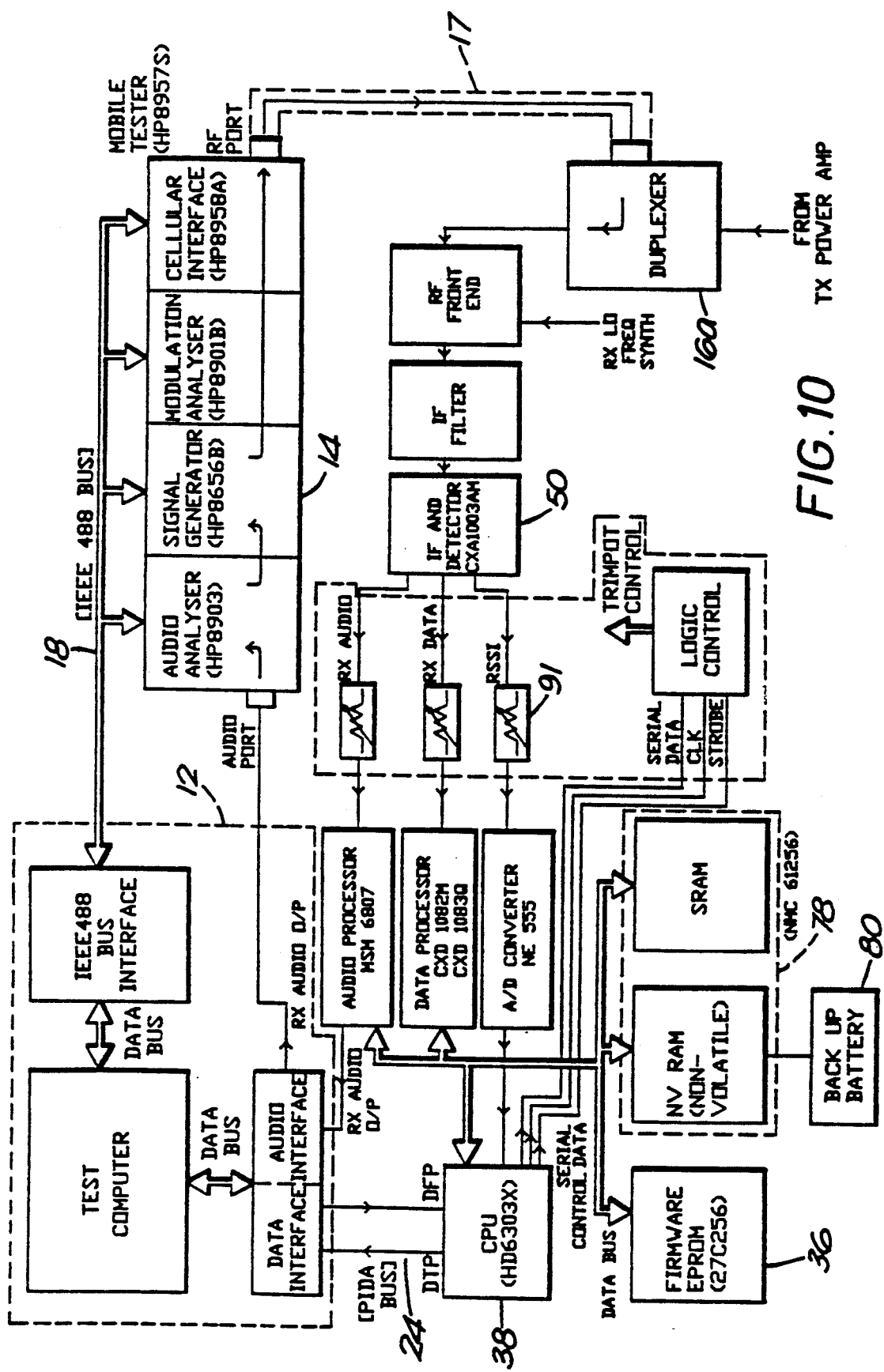

Turning now to FIGS. 9 and 10, there is illustrated the adjustment of various additional transmit and receive parameters. As a first example, the checking and adjustment of one of the transmit parameters, the signalling tone, will be described with reference to FIG. 9. The signalling tone is checked and if necessary adjusted by varying the resistance of a variable resistor 91 as shown and described in FIG. 8 according to data held and supplied from the Static RAM 78. In this case the mobile tester 14 is set so that both its modulation analyzer and audio analyzer will check the signal transmitted, and an audio test signal is sent to the telephone via an audio input line (TX AUDIO I/P in FIG. 9).

As a second example, the checking of the receive signal strength indicator will be described with reference to FIG. 10. An adjustable resistor 91 is provided in the line 52 between the detector 50 and a latch circuit 150 forming part of the CPU 38. A radio frequency signal of known strength is provided by the signal generator of the mobile tester 14 and is fed from the mobile tester to the telephone's antenna terminal 16 and detected in the detector 50. The resulting output passes via the line 52 and is strength evaluated by the CPU 38. This provides output data which is supplied via the PIDA bus 24 on the data to peripheral (DTP) line 4 of the peripheral connector (20 in FIG. 3) to the computer 12 for analysis. If this requires changing, then the value of the resistor 91 is altered by changing the data stored in and supplied by the Static Ram 78 in a manner analogous to the adjusting of the DAC's 74 and 90 as described above. In this case the new assigned value for the resistor 91 is stored also in the Static RAM 78.

In an analogous fashion the other resistors 91 can be adjusted to control the other parameters noted above.

A variable resistor 91 is provided in the line 54 for controlling the audio and data input from a received signal. This variable resistor 91 can be used to control both by being set to the level required for the data since a separate volume control is usually provided in the hand set for the final audio output volume and this volume control can be manually adjusted by the user to a suitable level.

It will be noted that for some changes it is necessary to input a signal through the peripheral connector (20 in FIG. 3) and monitor the output from the antenna terminal 16, while in other cases a generated signal is applied to the antenna terminal 16 and the resulting reaction of the telephone monitored through the peripheral connector 20. In all cases, new data to reset particular circuits within the telephone are input through the "data in" line of the peripheral connector to the data bus 76 and CPU 30 and are also stored in and update the Static RAM 78.

What is claimed is:

1. A method of setting a plurality of operational parameters in an electronic circuit of a radio telephone having a radio frequency output/input and an audio frequency input/output, said plurality of operational parameters including a transmission frequency, a transmitting power level, a transmission modulation, a receive audio level, a receive data level and a receive signal strength indication level, the method comprising the steps of:
    (a) applying a standard signal to said electronic circuit to cause said electronic circuit to provide an output signal corresponding to said operational parameter;
    (b) comparing said output signal to a desired standard;
    (c) applying an adjusting data signal to said electronic circuit for causing said output signal to approximate said desired standard;
    (d) storing said data signal for future control of said operational parameter; and
    (e) repeating steps (a) through (d) until said output signal is within a predetermined range of said desired standard.

2. A method of setting a plurality of operational parameters in an electronic circuit of a radio telephone having a radio frequency output/input and an audio frequency input/output, the method comprising the steps of:
    (a) setting the transmission frequency, wherein said step of setting the transmission frequency comprising the substeps of:
        (i) applying a standard signal to one of said radio frequency output/input and said audio frequency input/output to cause said electronic circuit to provide an output signal corresponding to said transmission frequency;
        (ii) comparing said output signal to a desired standard; and
        (iii) applying an adjusting data signal to one of said radio frequency output/input and said audio frequency input/output said electronic circuit for causing said output signal to approximate said desired standard when said output signal is not within a predetermined range of said desired standard;
        (iv) storing said data signal for future control of said transmission frequency; and
        (v) repeating substeps (i) through (iv) until said transmission frequency is within said predetermined range;
    (b) setting the transmitting power level using the methodology of step (a);
    (c) setting the transmission modulation using the methodology of step (a);
    (d) setting the receive audio level using the methodology of step (a);
    (e) setting the receive data level using the methodology of step (a); and
    (f) setting the receive signal strength using the methodology of step (a).

* * * * *